United States Patent
McWain et al.

(10) Patent No.: US 11,893,634 B2
(45) Date of Patent: *Feb. 6, 2024

(54) METHOD AND SYSTEM FOR CORRECTING ERRORS IN CONSUMER REPORTING

(71) Applicant: STATE FARM MUTUAL AUTOMOBILE INSURANCE COMPANY, Bloomington, IL (US)

(72) Inventors: Arthur McWain, Bloomington, IL (US); James J. Dunn, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 237 days.

This patent is subject to a terminal disclaimer.

(21) Appl. No.: 17/546,448

(22) Filed: Dec. 9, 2021

(65) Prior Publication Data

US 2022/0101428 A1 Mar. 31, 2022

Related U.S. Application Data

(63) Continuation of application No. 16/870,588, filed on May 8, 2020, now Pat. No. 11,232,518, which is a
(Continued)

(51) Int. Cl.
*G06Q 40/02* (2023.01)
*G06Q 40/03* (2023.01)
(Continued)

(52) U.S. Cl.
CPC .................. *G06Q 40/03* (2023.01)

(58) Field of Classification Search
None
See application file for complete search history.

(56) References Cited

U.S. PATENT DOCUMENTS

| 9,697,248 | B1 * | 7/2017 | Ahire | G06N 5/025 |
| 2006/0178971 | A1 * | 8/2006 | Owen | G06Q 40/00 |
| | | | | 705/35 |

(Continued)

FOREIGN PATENT DOCUMENTS

WO WO-2009052689 A1 4/2009

OTHER PUBLICATIONS www.disputedoc.com via Wayback Machine at https://archive.org/web/, Apr. 22, 2018 (Year: 2018).*
(Continued)

*Primary Examiner* — Ryan D Donlon
*Assistant Examiner* — Irene S Kang
(74) *Attorney, Agent, or Firm* — MARSHALL, GERSTEIN & BORUN LLP

(57) ABSTRACT

A method and system may detect and correct errors in consumer reporting. A secure data file such as a Metro 2® formatted file may be obtained for a consumer that includes the consumer's credit information. A consumer reporting server may generate a non-sensitive private information (non-SPI) consumer identifier that references non-SPI consumer credit information included in the Metro 2® formatted file. Then a member of the organization may access the non-SPI consumer credit information to review the non-SPI consumer credit information and detect and correct errors. Errors may be detected by training a machine learning model using a first set of non-sensitive private information (non-SPI) consumer credit information from statements including errors and a second set of non-SPI consumer credit information from statements that do not include errors. The non-SPI consumer credit information for the consumer may be applied to the model to identify errors.

20 Claims, 8 Drawing Sheets

Related U.S. Application Data continuation of application No. 15/700,394, filed on Sep. 11, 2017.

(60) Provisional application No. 62/554,938, filed on Sep. 6, 2017.

(51) Int. Cl.
*G06F 11/00* (2006.01)
*G06Q 40/04* (2012.01)

(56) References Cited

U.S. PATENT DOCUMENTS

| | | | | |
|---|---|---|---|---|
| 2006/0206418 A1* | 9/2006 | Byrne | ................... | G06Q 20/40 705/39 |
| 2006/0218067 A1* | 9/2006 | Steele | ................... | G06Q 40/00 705/35 |
| 2014/0025562 A1* | 1/2014 | Rothrock | ............ | G06Q 40/025 705/38 |
| 2019/0043125 A1* | 2/2019 | Cropper | ................ | G06Q 30/01 |

OTHER PUBLICATIONS

U.S. Appl. No. 15/093,298, filed Apr. 7, 2016.
Laver et al, Metro 2 Reporting, Fidelity Integarted Financial Solutions (2004).
2011 Credit Reporting Resource Guide, Consumer Data Industry Association (2011).
U.S. Appl. No. 15/700,394, filed Sep. 11, 2017.
U.S. Office Action for U.S. Appl. No. 16/870,588, dated Apr. 14, 2021.
U.S. Office Action for U.S. Appl. No. 15/700,394, dated Oct. 6, 2021.
U.S. Office Action for U.S. Appl. No. 15/700,394, dated May 14, 2021.
U.S. Office Action for U.S. Appl. No. 15/700,394, dated Jan. 28, 2021.
U.S. Office Action for U.S. Appl. No. 15/700,394, dated Oct. 7, 2020.
U.S. Office Action for U.S. Appl. No. 15/700,394, dated Jun. 26, 2020.

* cited by examiner

300

| | | |
|---|---|---|
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |
| 16641110432019101 | 348802020497 | I01020412100942092323 |

604 — Account:    606 — Type: 00    608 — Status: 11   610 — Cur Bal: $11,650.00

612 — Telephone:
620 — DOB: Dt Open: 25JAN2013   ECOA: 2   618 — Sch Pmt:  $475.00
628 — SSN:        Dt Closed: 622   624 — Cli:   626 — Act Pmt:   $0.00
636 — CIS: 00003942267   DOFD: 630   632 — CCC:   634 — Amt Pst:   $0.00
646 — Pmt Rt: 0   Lst Pmt: 11JUN2016   Cr Lmt: $0.00   642 — Ong CO:   $0.00
                  Port typ: 1         650 — Sp Comm: 640   652 — HCOLA: $25,939.00
644 — PHP: BBBBBBBBBBBBBB   638   648

J1

Telephone:
DOB:              ECOA: 2
SSN:              Cli:
654 — CIS: 00003942268

+6/30/2016   Account #:   Type: 00   Status: 11   Cur Bal: $11,443.00

+5/31/2016   Account #:   Type: 00   Status: 11   Cur Bal: $11,867.00

+4/29/2016   Account #:   Type: 00   Status: 11   Cur Bal: $12,263.00

Moon Tab

METHOD AND SYSTEM FOR CORRECTING ERRORS IN CONSUMER REPORTING

CROSS-REFERENCE TO RELATED APPLICATIONS

This application is a continuation of U.S. application Ser. No. 16/870,588, filed May 8, 2020 and titled "Method and System for Correcting Errors in Consumer Reporting," which is a continuation of U.S. application Ser. No. 15/700,394, filed Sep. 11, 2017 and titled "Method and System for Correcting Errors in Consumer Reporting," which claims priority to and the benefit of the filing date of provisional U.S. Patent Application No. 62/554,938 entitled "Method and System for Correcting Errors in Consumer Reporting," filed on Sep. 6, 2017, the entire contents of which is hereby expressly incorporated herein by reference.

TECHNICAL FIELD

The present disclosure generally relates to detecting and correcting errors in consumer reporting and, more particularly to circumventing restrictions on secure data files to provide access to consumer credit information to members across several divisions of an organization to correct errors in consumer reports.

BACKGROUND

Today, consumers' credit history information is reported to major credit reporting agencies such as Experian, Equifax, TransUnion, and Innovis in a standardized format called Metro 2®. Organizations that report information to these credit reporting agencies may be referred to as herein as "data furnishers." By providing information in the Metro 2® format, data furnishers meet compliance requirements and are able to report accurate, complete, and timely consumer credit information.

However, large organizations may have several divisions such as an insurance provider (or financial services provider) that includes several divisions such as an automobile insurance division, a life insurance division, a banking division including a vehicle loan subdivision and a home loan subdivision, an insurance claims division, an insurance sales division, an insurance underwriting division, a homeowner's insurance division, etc. Members within different divisions or products lines may not have access to consumers' credit information. As a result, when there is an error on a consumer's credit report it may be very difficult to access and identify the root cause of the error without access to the consumer's reported credit information. It may also be difficult to identify recurring inaccuracies in these reports and to proactively correct such inaccuracies throughout the consumer reporting system.

SUMMARY

To detect and correct errors in consumer reporting, a consumer reporting system may obtain a secure data file that includes consumer credit information for a consumer, such as a Metro 2® formatted file. The consumer reporting system may then add additional fields to the secure data file which may include a consumer identifier that is non-sensitive private information (non-SPI). The non-SPI consumer identifier may then be used to store the appended secure data file or a portion thereof so that the resulting data file may be searchable and accessible by members within several divisions or products lines throughout an organization, for example, via a client application. Additionally, the non-SPI consumer identifier may be used as a key to retrieve the corresponding data file or portions of the corresponding data file that do not include SPI for display to a user. For example, when a consumer calls the organization and claims that there is an error in her consumer report related to a particular division or product line, a member of the organization in the particular division or product line may retrieve her credit information via the client application by entering her non-SPI consumer identifier. In some instances, the member may compare the consumer's credit information to user profile information from the consumer's user profile to identify inconsistencies and determine the cause of the error. For example, the consumer's user profile may store account information such as bank statements and payment history. This may be compared to the information in the consumer's credit history to determine whether the consumer made a mistake or interpreted her consumer report incorrectly or whether the consumer report does include errors.

When there is an error in the consumer report, the user or the consumer reporting system may correct the error by modifying the secure data file. In an implementation, the user or the consumer reporting system may provide the modified secure data file to the credit reporting agencies. In another implementation, a third party vendor may send unmodified information to the credit reporting agencies without interfacing with the user or the consumer reporting system. In some scenarios, the consumer reporting system may automatically identify errors in consumers' credit information before secure data files are provided to the credit reporting agencies. The consumer reporting system may cross-reference the consumer credit information with user profile information from the consumer's user profile and may provide an alert to a member of the organization when there is an inconsistency or may replace the consumer credit information with the user profile information from the consumer's user profile.

Additionally, the consumer reporting system may identify recurrent errors across several consumers and apply a correction method to current and future secure data files. More specifically, the consumer reporting system may store and analyze previous reporting errors to identify several instances of the same or similar errors within a threshold duration. When the same error occurs with greater than a threshold frequency, the consumer reporting system may apply the same correction method to several current and future secure data files. For example, when an error occurs in the same data field of several secure data files, the consumer reporting system may parse the particular data field in other secure data files to determine whether the particular data field has a same or similar value as the previous secure data files having the error in the particular data field. When the particular data field has a same or similar value as the previous secure data files, the error may be corrected in the same or similar manner as the previous secure data files. In one example, the error may be corrected by applying user profile information for the consumer corresponding to the particular data field. In another example, the error may be corrected by appending an alphanumeric string to the front or back of the value or replacing the value with a particular alphanumeric string. In yet another example, the error may be corrected by applying consumer data from another source that corresponds to the particular data field.

In this manner, the consumer reporting system provides a tool for reactively and proactively verifying and correcting errors in a consumer's credit information. Additionally, the present embodiments advantageously identify common errors when secure data files such as Metro 2® formatted files are initially generated. The consumer reporting system may then correct such errors on a system wide level before the secure data files are provided to credit reporting agencies. This may increase the accuracy of consumer credit information and thus, credit reports. Furthermore, the present embodiments advantageously allow for storage and retrieval of consumer credit information outside of a secure data set, so that the consumer credit information is accessible to members across several divisions or products lines of an organization.

In an embodiment, a computer-implemented method for correcting errors in consumer reporting includes training a machine learning model for identifying errors in consumer credit reporting using (i) a first set of non-sensitive private information (non-SPI) consumer credit information from statements including errors, and (ii) a second set of non-SPI consumer credit information from statements that do not include errors. The method further includes obtaining a secure data file including non-SPI consumer credit information for a consumer related to one or more products and generating a non-sensitive private information (non-SPI) consumer identifier corresponding to the non-SPI consumer credit information, where the non-SPI consumer identifier references the non-SPI consumer credit information. The method also includes receiving, via a client application of a user, a request for non-SPI consumer credit information of the consumer, the request including the non-SPI consumer identifier. In response to verifying that the user has permission to access the non-SPI consumer credit information, the method includes parsing the secure data file to identify one or more particular data fields, and for each particular data field, a subset of the non-SPI consumer credit information corresponding to the particular data field, applying the subset of the non-SPI consumer credit information for each particular data field to the machine learning model to identify an error in the non-SPI consumer credit information, and presenting an indication of the identified error along with a subset of the non-SPI consumer credit information corresponding to the identified error to be displayed via the client application on a client device.

In another embodiment, a system for correcting errors in consumer reporting includes one or more processors, a communication network, and a non-transitory computer-readable memory coupled to the one or more processors and the communication network and storing instructions thereon. When executed by the one or more processors, the instructions cause the system to train a machine learning model for identifying errors in consumer credit reporting using (i) a first set of non-sensitive private information (non-SPI) consumer credit information from statements including errors, and (ii) a second set of non-SPI consumer credit information from statements that do not include errors. The instructions further cause the system to obtain a secure data file including non-SPI consumer credit information for a consumer related to one or more products and generate a non-sensitive private information (non-SPI) consumer identifier corresponding to the non-SPI consumer credit information, wherein the non-SPI consumer identifier references the non-SPI consumer credit information. The instructions further cause the system to receive, via the communication network from a client application of a user, a request for non-SPI consumer credit information of the consumer, the request including the non-SPI consumer identifier. In response to verifying that the user has permission to access the non-SPI consumer credit information, the instructions cause the system to parse the secure data file to identify one or more particular data fields, and for each particular data field, a subset of the non-SPI consumer credit information corresponding to the particular data field, apply the subset of the non-SPI consumer credit information for each particular data field to the machine learning model to identify an error in the non-SPI consumer credit information, and present, via the communication network, an indication of the identified error along with a subset of the non-SPI consumer credit information corresponding to the identified error to be displayed via the client application on a client device.

In yet another embodiment, a non-transitory computer-readable memory stores instructions thereon. When executed by the one or more processors, the instructions cause the one or more processors to train a machine learning model for identifying errors in consumer credit reporting using (i) a first set of non-sensitive private information (non-SPI) consumer credit information from statements including errors, and (ii) a second set of non-SPI consumer credit information from statements that do not include errors. The instructions further cause the one or more processors to obtain a secure data file including non-SPI consumer credit information for a consumer related to one or more products and generate a non-sensitive private information (non-SPI) consumer identifier corresponding to the non-SPI consumer credit information, wherein the non-SPI consumer identifier references the non-SPI consumer credit information. The instructions further cause the one or more processors to receive, via the communication network from a client application of a user, a request for non-SPI consumer credit information of the consumer, the request including the non-SPI consumer identifier. In response to verifying that the user has permission to access the non-SPI consumer credit information, the instructions cause the one or more processors to parse the secure data file to identify one or more particular data fields, and for each particular data field, a subset of the non-SPI consumer credit information corresponding to the particular data field, apply the subset of the non-SPI consumer credit information for each particular data field to the machine learning model to identify an error in the non-SPI consumer credit information, and present, via the communication network, an indication of the identified error along with a subset of the non-SPI consumer credit information corresponding to the identified error to be displayed via the client application on a client device.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 3 illustrates an exemplary display of the contents of a secure data file in accordance with an exemplary aspect of the present disclosure;

FIG. 6 illustrates an exemplary non-SPI consumer credit information display in accordance with an exemplary aspect of the present disclosure;

FIG. 8 illustrates an alternate exemplary consumer search display in accordance with an exemplary aspect of the present disclosure.

DETAILED DESCRIPTION

Figure 1:
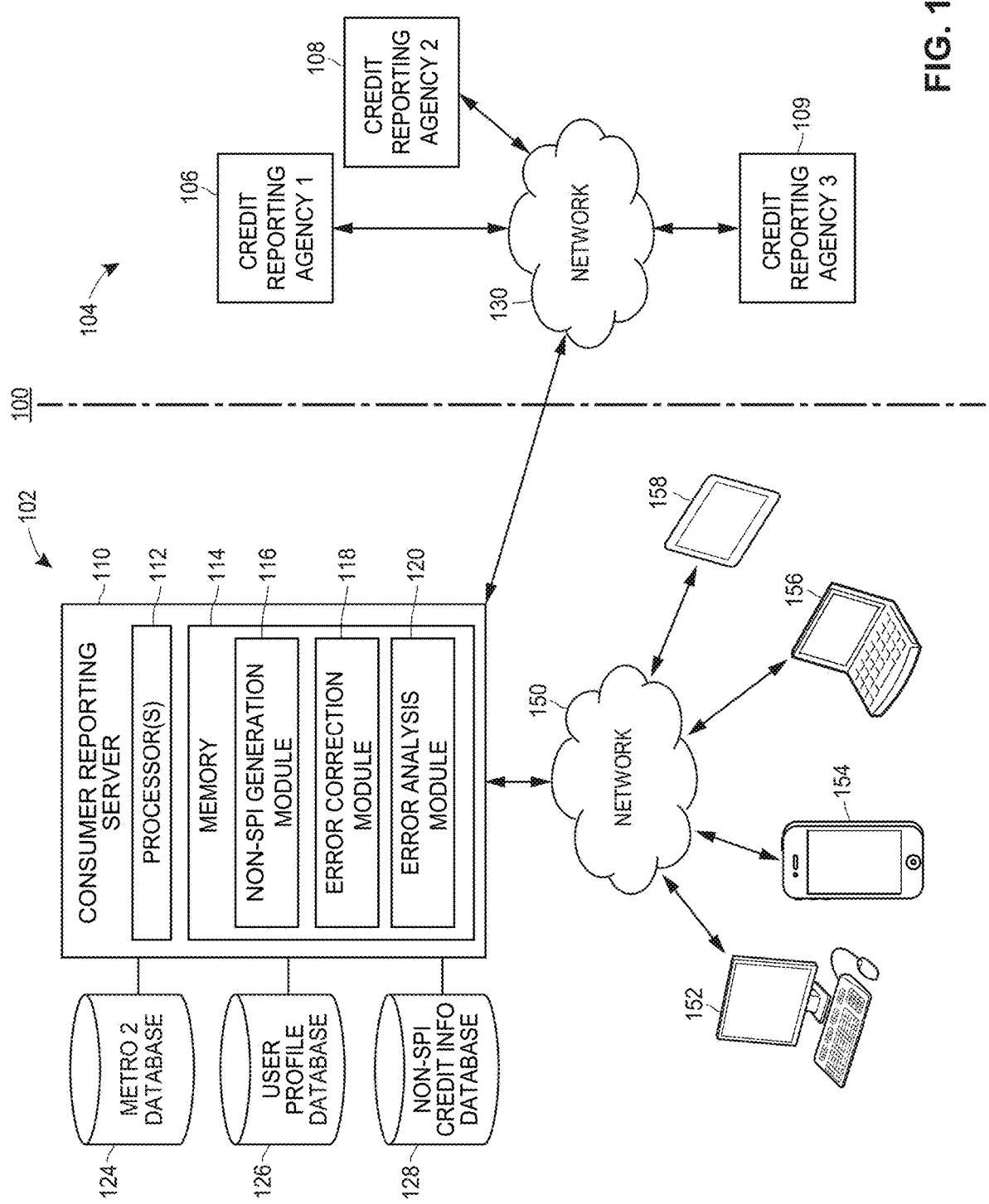
FIG. 1 illustrates a block diagram of a computer network and system on which an exemplary consumer reporting system may operate in accordance with an exemplary aspect of the present disclosure.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, as used herein, the term "organization" or "data furnisher" may refer to a business, society, association, institution, agency, etc. that reports information to credit reporting agencies. An organization may include a bank, a credit union, a savings and loans institution, a mortgage lender, credit card issuer, a collection agency, a retail installment lender, an auto finance lender, etc. A "member" of the organization as used herein, may refer to an employee or agent of the organization working on behalf of the organization and/or in a particular department of the organization. Members may be agents or other customer service representatives who interact with consumers regarding consumer credit information.

The term "sensitive private information" (SPI) or "personally identifiable information (PII) as used herein, may be used to refer to information that may be used on its own or with other information to identify, contact, or locate a single person, or identify an individual in context. SPI may include a full name, home address, social security number, date of birth, credit card number, etc. The term "consumer credit information" as used herein, may be used to refer to financial information for a consumer regarding the consumer's credit or loan statements, including a credit limit, current balance, payment history, etc.

Generally speaking, techniques for detecting and correcting errors in consumer reporting may be implemented in one or more network servers, one or more organization member devices, one or more credit reporting agency devices, or a system that includes a combination of these devices. However, for clarity, the examples below focus primarily on an embodiment in which a consumer reporting server obtains a secure data file that includes consumer credit information for a consumer, such as a Metro 2® formatted file. The consumer reporting server appends a non-SPI consumer identifier to the Metro 2® formatted file, where the non-SPI consumer identifier may be used as a key or reference for searching for the Metro 2® formatted file or a portion thereof. A member of the organization that generates the consumer credit information (also referred to herein as "user") may then search for a particular consumer's credit information on her member device. The member device provides the non-SPI consumer identifier to the consumer reporting server and in turn, the consumer reporting server provides non-SPI credit information from the Metro 2® formatted file for display on the member device. When the member detects an error in the non-SPI credit information (e.g., by receiving a call from a consumer who identifies the error in her credit report), the member may correct the error via her member device and the correction may be entered into the Metro 2® formatted file. In other scenarios, the member device may provide an indication of the error to the consumer reporting server and the consumer reporting server may automatically correct the error via one or more error correction techniques described in more detail below. In yet other scenarios, the consumer reporting device may automatically detect and correct the error. The corrected Metro 2® formatted file may then be provided from the consumer reporting server to one or more credit reporting agency devices corresponding to one or more credit reporting agencies, such as Experian, Equifax, TransUnion, Innovis, etc.

Referring to FIG. 1, various aspects of an example environment implementing a consumer reporting system 100 is illustrated. The high-level architecture includes both hardware and software applications, as well as various data communications channels for communicating data between the various hardware and software components. The consumer reporting system 100 may be roughly divided into components within an organization network 102 (e.g., components which may have access to secure data files for an organization), and components outside of the organization network 104 (e.g., components which may not have access to the secure data files). The components within the organization network 102 may include a consumer reporting server device 110 and/or a plurality of organization member devices 152-158 (also referred to herein as "member devices") which may be communicatively connected through an organization network 150, as described below. The components outside of the organization network 104 may include a plurality of credit reporting agency (CRA) devices 106-109 which may be communicatively connected to the components within the organization 102 through a network 130, as described below.

The consumer reporting server device 110 may have an associated Metro 2 database 124 for storing secure data files, an associated user profile database 126 for storing user profile information for consumers, and an associated non-SPI consumer credit information database 128 for storing non-SPI consumer credit information for consumers that may be viewed by organization members across several divisions and product lines.

Moreover, the consumer reporting server device 110 may include one or more processor(s) 112 such as a microprocessor coupled to a memory 114. The memory 114 may be tangible, non-transitory memory and may include any types of suitable memory modules, including random access memory (RAM), read-only memory (ROM), flash memory, other types of persistent memory, etc. The memory 114 may store, for example instructions executable on the processors 112 for a non-SPI generation module 116, an error correction module 118, and an error analysis module 120. The consumer reporting server device 110 is described in more detail below with reference to FIG. 2A.

The non-SPI generation module 116 may obtain a secure data file, such as a Metro 2® formatted file for a consumer from the Metro 2 database 124. In some embodiments, the Metro 2 database stores Metro 2® formatted files for each consumer that has a financial relationship with the organization. A Metro 2® formatted file may include several data fields, such as a consumer account number, a portfolio type, an account type, a date opened, a credit limit, a highest credit or loan amount, a term duration, a term frequency, a scheduled monthly payment amount, an actual payment amount, an account status, a payment rating, a payment history profile indicating the consumer's payment history for the previous 24 months, a current balance, an amount past due, a billing date, a date closed, a date of last payment, a first and last name, a social security number, a birth date, a telephone number, an Equal Credit Opportunity Act (ECOA) code, an address, and/or any other suitable credit information for the consumer.

The portfolio type may include "C" for line of credit, "I" for installment, "M" for mortgage, "O" for open account, or "R" for revolving. The account type may indicate the type of account or financing provided to the consumer. For example, the account type may be "00" for an auto account, "04" for a home improvement account, "10" for a business loan, "18" for a credit card account, etc. The account status may be "11" indicating the account is current and has non-zero balance amount, "71" indicating the account is 30 days past due, "78" indicating the account is 60 days past due, "80" indicating the account is 90 days past due, "82" indicating the account is 120 days past due, "83" indicating the account is 150 days past due, "84" indicating the account is 180 days or more past due, etc. The payment rating indicates whether the account is current, past due, in collections, or charged off. The payment rating may be "0" indicating a current account, "1" indicating payment is 30-59 days past due, "2" indicating payment is 60-89 days past due, "3" indicating payment is 90-119 days past due, "4" indicating payment is 120-149 days past due, "5" indicating payment is 150-179 days past due, "6" indicating payment is 180 or more days past due, "G" indicating collection, or "L" indicating charge-off.

The payment history profile indicates the consumer's payment history for the previous 24 months. Each character in the payment history profile indicates the payment activity for one of the 24 months. The payment history for one month may be "0" indicating 0 payments are past due, "1" indicating a payment is 30-59 days past due, "2" indicating a payment is 60-89 days past due, "3" indicating a payment is 90-119 days past due, "4" indicating a payment is 120-149 days past due, "5" indicating a payment is 150-179 days past due, "6" indicating a payment is 180 or more days past due, "B" indicating there is no payment history available prior to this time, "D" indicating there is no payment history available for that month, "E" indicating zero balance on the current account, "G" indicating collection, "H" indicating foreclosure, "J" indicating voluntary surrender, "K" indicating repossession, or "L" indicating charge-off. The ECOA code may indicate the type of liability for the consumer. The ECOA code may be "1" for an individual contractual liability, "2" for joint contractual liability, "7" for a maker which has a co-maker that is subject to liability if the maker defaults, "T" for a terminated account, "W" for a business/commercial account, "X" for when the consumer is deceased, etc.

In any event, the non-SPI generation module 116 may append a non-SPI consumer identifier to the Metro 2® formatted file or to an additional data set that includes the non-SPI consumer credit information within the Metro 2® formatted file. For example, the non-SPI consumer identifier may be assigned by a vendor or may be generated based on the consumer's social security number. Then the non-SPI consumer identifier may be used as a reference or key to the consumer's credit information and more specifically, the consumer's non-SPI credit information. In some embodiments, the non-SPI generation module 116 may store the non-SPI portions of the Metro 2® formatted file in the non-SPI credit information database 128. Then when a member of the organization searches for the consumer's credit information via the non-SPI consumer identifier on a member device, the non-SPI credit information for the corresponding consumer may be provided on the display of the member device.

The error correction module 118 may obtain indications of errors corresponding to particular data fields in the non-SPI credit information. For example, the error correction module 118 may receive an indication that the scheduled monthly payment amount for a consumer is incorrect. In some embodiments, the error correction module 118 may obtain an indication of an error from a member device 152-158. For example, a consumer may contact the organization upon identifying an error in her credit report and a member of the organization may retrieve and display the non-SPI credit information for the consumer on her member device 152 to verify that there is an error in the consumer's credit information. Upon verifying the error, the member device 152 may transmit an indication of the error to the error correction module 118 including the data field corresponding to the error. In other embodiments, the error correction module 118 may automatically detect the error for example, by comparing the non-SPI credit information to user information from the consumer's user profile.

In any event, the error correction module 118 may then correct the error by for example, applying a subset of the user information from the consumer's user profile that corresponds to the same data field as the error (e.g., the credit limit). In another example, the error correction module 118 may receive the correct credit information from the member device 152. The correct credit information may be updated in the consumer's Metro 2® formatted file and the error correction module 118 may provide the updated Metro 2® formatted file to the credit reporting agency devices 106-109.

The error analysis module 120 may analyze several errors in each data field for several consumer's non-SPI credit information to identify trends or commonly occurring errors. The error analysis module 120 may also analyze the corrections applied to the errors to identify common corrections applied to several consumers' non-SPI credit information for the same data field. For example, when an error is identified in the same data field for more than a threshold number and/or proportion of consumers within a particular time period, the error analysis module 120 may detect a trend for that data field. The error analysis module 120 may then analyze the corrections applied to the data field corresponding to the trend to determine whether there is a consistent correction method being applied each time. When a consistent correction method is identified by the error analysis module 120, the error analysis module 120 may apply the correction method to upcoming sets of consumer credit information before the consumer credit information is provided to the credit reporting agencies 106-109 in the Metro 2® format. A consistent correction method may be identified when the same correction method is applied to more than a threshold number and/or proportion of errors.

For example, when an error is identified in the same data field for more than a threshold number or proportion of consumers and the value for the data field is changed to the same value more than a threshold number or proportion of times, the error analysis module 120 may determine there is a consistent correction method being applied. Then the error analysis module 120 may automatically modify data fields for upcoming sets of consumer credit information to the changed value identified from the previous errors.

In another example, when an error is identified in the same data field for more than a threshold number or proportion of consumers and the value for the data field is changed using the same algorithm more than a threshold number or proportion of times (e.g., by multiplying the value by a factor of two, by appending the letter 'E' to the end of the string, by subtracting the value by one, etc.), the error analysis module 120 may determine there is a consistent correction method being applied. Then the error analysis module 120 may automatically modify data fields for upcoming sets of consumer credit information using the algorithm identified from the previous errors.

In any event, the member devices 152-158 may include, by way of example, a desktop computer 152, a mobile device smart-phone 154, a laptop computer 156, a tablet computer 158, a portable media player, a wearable computing device, smart glasses, smart watches, phablets, other smart devices, devices configured for wired or wireless RF (Radio Frequency) communication, a cell phone, a personal digital assistant (PDA), etc. Of course, any member device appropriately configured may interact with the consumer reporting system 100.

The member devices 152-158 need not necessarily communicate with the organization network 150 via a wired connection. In some instances, the member devices 152-158 may communicate with the organization network 150 via wireless signals and, in some instances, may communicate with the organization network 150 via an intervening wireless or wired device, which may be a wireless router, a wireless repeater, a base transceiver station of a mobile telephony provider, etc. The member devices 152-158 may include devices which are used by members of an organization to access an organization communication network, such as a local area network (LAN), a virtual private network (VPN), etc.

The member devices 152-158 may access the organization network 150 via member profiles and may access data assets shared within the organization network 150 based on permissions associated with security groups corresponding to the member profiles. Moreover, the member devices 152-158 may also include devices which may be used to set and/or change permissions for security groups to access data assets, and to place and/or remove member profiles from security groups. For example, the member devices 152-158 may include a member device used by a system administrator.

Each of the member devices 152-158 may interact with the consumer reporting server device 110 to receive web pages and/or server data and may display the web pages and/or server data via a client application and/or an Internet browser (described below). For example, the desktop computer 152 may display an application screen of a client application (e.g., an error detection/correction application) and/or a web page to a user, receive an input from the user, and/or interact with the consumer reporting server device 110 depending on the type of user-specified input. For example, the consumer reporting server device 110 may generate an application screen which includes non-SPI credit information for a consumer in response to receiving a non-SPI consumer identifier corresponding to the non-SPI credit information from the desktop computer 152.

It will be appreciated that although only one consumer reporting server device 110 is depicted in FIG. 1, multiple consumer reporting servers 110 may be provided for the purpose of distributing server load, serving different web pages, etc. These multiple consumer reporting servers 110 may include a web server, an entity-specific server (e.g. an Apple® server, etc.), a server that is disposed in a retail or proprietary network, etc. The multiple consumer reporting servers 110 may also include the non-SPI generation module 116, the error correction module 118, and the error analysis module 120 as separate servers which may communicate with each other via the organization network 150.

The consumer reporting server device 110 may communicate with the member devices 152-158 via the organization network 150. The digital organization network 150 may be a proprietary network, a secure public Internet, a local area network (LAN), a wide area network (WAN), a virtual private network (VPN) and/or some other type of network, such as a public switched telephone network (PTSN) which may include dedicated access lines, plain ordinary telephone lines, satellite links, combinations of these, etc. Where the digital organization network 150 comprises the Internet, data communication may take place over the organization network 150 via an Internet communication protocol. In some embodiments, the digital organization network 150 may be a password protected organization network where only members of the organization having member profiles and/or system administrators may access the organization network.

While the consumer reporting system 100 includes member devices 152-158, this is merely for ease of illustration only. The consumer reporting system 100 may include tens of member devices, hundreds of member devices, thousands of member devices or any other suitable number of member devices.

The credit reporting agency (CRA) devices 106-109 may include, by way of example, a desktop computer, a mobile device smart-phone, a laptop computer, a tablet computer, a portable media player, a wearable computing device, smart glasses, smart watches, phablets, other smart devices, devices configured for wired or wireless RF (Radio Frequency) communication, a cell phone, a personal digital assistant (PDA), etc. Of course, any CRA device appropriately configured may interact with the consumer reporting system 100. The CRA devices 106-109 need not necessarily communicate with the network 130 via a wired connection. In some instances, the CRA devices 106-109 may communicate with the network 130 via wireless signals and, in some instances, may communicate with the network 130 via an intervening wireless or wired device, which may be a wireless router, a wireless repeater, a base transceiver station of a mobile telephony provider, etc.

Each of the CRA devices 106-109 may interact with the consumer reporting server device 110 to receive secure data files, such as Metro 2® formatted files corresponding to consumers to generate credit reports for the consumers. For example, each of the CRA devices 106-109 may correspond to a different credit reporting agency, such as Experian, Equifax, TransUnion, Innovis, etc. For a particular consumer, the consumer reporting server device 110 may provide a Metro 2® formatted file indicating the consumer's credit information related to the organization to each of the CRA devices 106-109. The corresponding credit reporting agencies may then combine the consumer credit information related to the organization with consumer credit information related to several other organizations to generate a credit report for the consumer.

The consumer reporting device 110 may communicate with the CRA devices 106-109 via the network 130. The digital network 130 may be a proprietary network, a secure public Internet, a virtual private network and/or some other type of network. Where the digital network 130 comprises the Internet, data communication may take place over the digital network 130 via an Internet communication protocol.

While the consumer reporting system 100 includes three CRA devices 106-109, this is merely for ease of illustration only. The consumer system 100 may include hundreds of CRA devices, thousands of CRA devices, or any other suitable number of CRA devices.

Figure 2A:
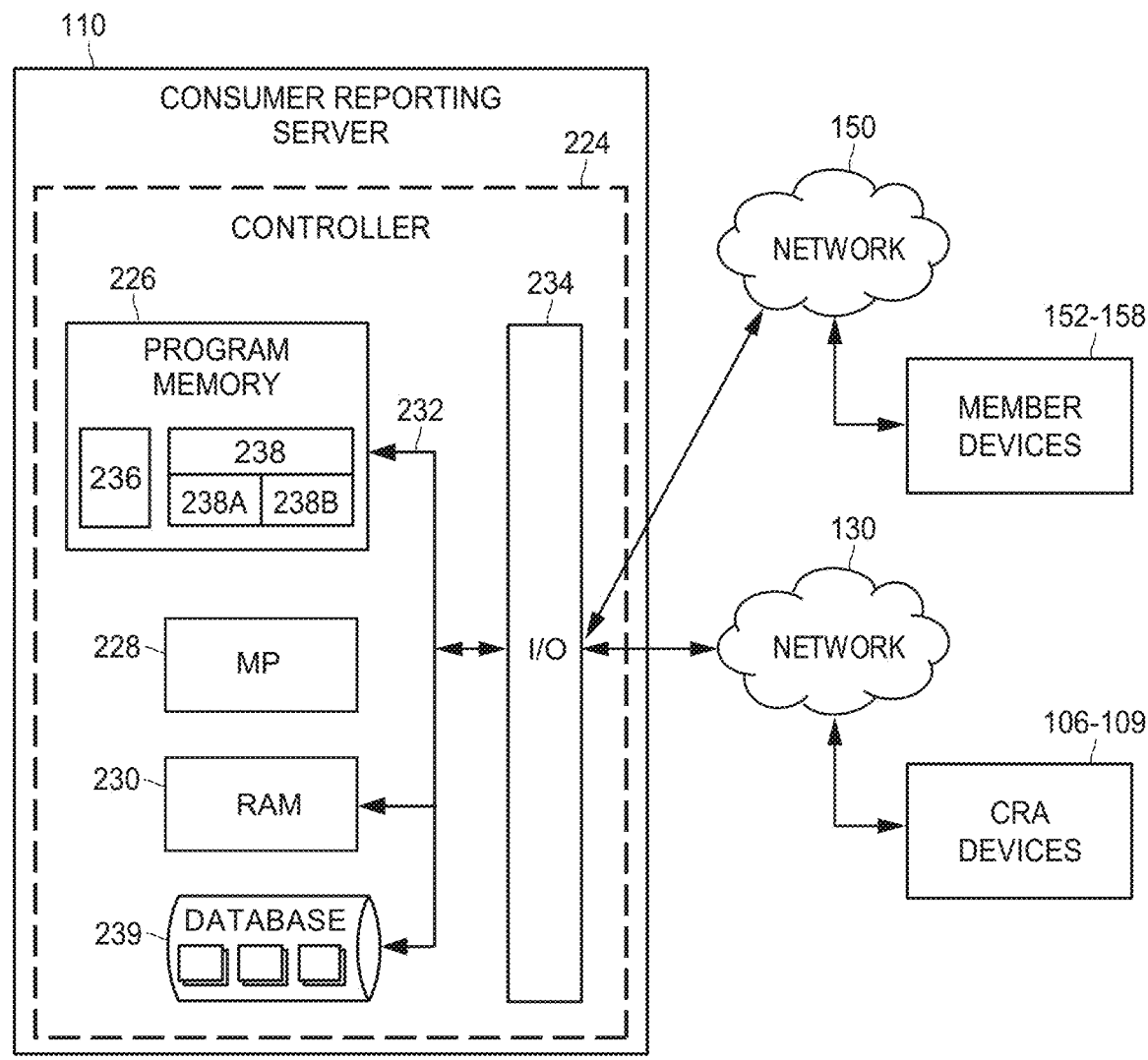
FIG. 2A illustrates a block diagram of an exemplary server device that can operate in the system of FIG. 1.

Turning now to FIG. 2A, the consumer reporting server device 110, may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. The program memory 226 and the microprocessor 228 may be similar to the memory 114 and processor 112 respectively, as described in FIG. 1. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as consumer credit information, member login information, user profile data, web page templates and/or web pages, and other data necessary to interact with users, and/or members through the network 130 and/or the organization network 150. It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the consumer reporting server device 110, which user interface may, for example, allow the system administrator to configure, troubleshoot, and/or test various aspects of the consumer reporting server's operation, including assigning member profiles to security groups for accessing data files. A server application 238 may operate to generate non-SPI consumer identifiers, retrieve and provide non-SPI consumer credit information, detect and correct errors in the consumer credit information, etc. The server application 238 may be a single module 238 or a plurality of modules 238A, 238B, 238C (not shown), such as the non-SPI generation module 116, the error correction module 118, and the error analysis module 120, respectively.

While the server application 238 is depicted in FIG. 2A as including two modules, 238A and 238B, the server application 238 may include any number of modules accomplishing tasks related to implementation of the consumer reporting server device 110.

Figure 2B:
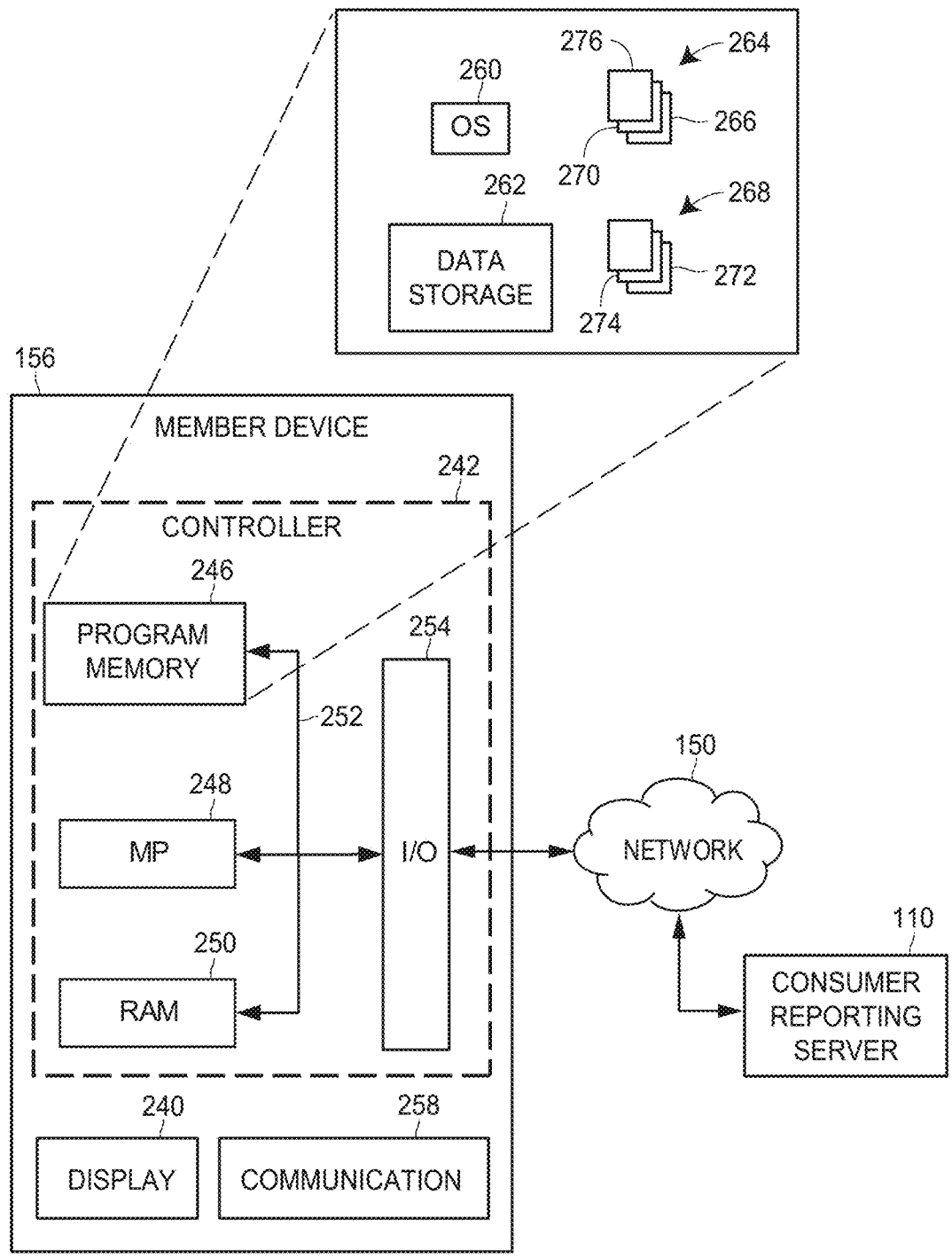
FIG. 2B illustrates a block diagram of an exemplary member device that can operate in the system of FIG. 1.

Referring now to FIG. 2B, the laptop computer 156 (or any of the member devices 152-158) may include a display 240, a communication unit 258, a user-input device (not shown), and, like the consumer reporting server device 110, a controller 242. Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, data storage 262, a plurality of software applications 264, and/or a plurality of software routines 268. The operating system 260, for example, may include Microsoft Windows®, OS X®, Linux®, Unix®, etc.

The data storage 262 may include data such as member profiles, application data for the plurality of applications 264, routine data for the plurality of routines 268, and/or other data necessary to interact with the consumer reporting server device 110 through the digital organization network 150. In some embodiments, the controller 242 may also include, or otherwise be communicatively connected to, other data storage mechanisms (e.g., one or more hard disk drives, optical storage drives, solid state storage devices, etc.) that reside within the laptop computer 156.

The communication unit 258 may communicate with the consumer reporting server device 110 via any suitable wireless communication protocol network, such as a wireless telephony network (e.g., GSM, CDMA, LTE, etc.), a Wi-Fi network (802.11 standards), a WiMAX network, a Bluetooth network, etc. The user-input device (not shown) may include a "soft" keyboard that is displayed on the display 240 of the laptop computer 156, an external hardware keyboard communicating via a wired or a wireless connection (e.g., a Bluetooth keyboard), an external mouse, or any other suitable user-input device.

As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 246, in addition to other software applications. One of the plurality of applications 264 may be a client application 266 that may be implemented as a series of machine-readable instructions for performing the various tasks associated with receiving information at, displaying information on, and/or transmitting information from the laptop computer 156.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information from the consumer reporting server device 110 while also receiving inputs from the member.

Another application of the plurality of applications may include an embedded web browser 276 that may be implemented as a series of machine-readable instructions for receiving, interpreting, and/or displaying web page information from the consumer reporting server device 110.

One of the plurality of routines may include a member login routine 272 which obtains member login information from the member, transmits the login information to the consumer reporting server device 110, and/or displays data files according to the member profile associated with the login information on the display 240. Another routine in the plurality of routines may include a consumer credit information display routine 274 that receives a non-SPI consumer identifier for retrieving consumer credit information and displays the consumer credit information retrieved from the consumer reporting server device 110.

Preferably, a member may launch the client application 266 from a member device, such as one of the member devices 152-158, to communicate with the consumer reporting server device 110 to implement the consumer reporting system 100. Additionally, the member may also launch or instantiate any other suitable user interface application (e.g., the native application or web browser 270, or any other one of the plurality of software applications 264) to access the consumer reporting server device 110 to realize the consumer reporting system 100.

FIG. 3 depicts an example secure data file 300, such as a Metro 2® formatted file which may be displayed by the client application 266 of one of the member devices 152-158. As will be appreciated by those of ordinary skill in the relevant art(s), the exemplary display shown in FIG. 3 is for illustrative purposes, and the associated functionality may be implemented using any suitable format and/or design for facilitating corresponding described functionalities without departing from the spirit and scope of the present disclosure.

In some embodiments, the Metro2® formatted file for a consumer may only be viewed by a very small subset of members within a consumer reporting team. Members across several divisions or product lines of the organization, such as an automobile insurance division, a life insurance division, a banking division including a vehicle loan subdivision and a home loan subdivision, an insurance claims division, an insurance sales division, an insurance underwriting division, a homeowner's insurance division, etc., may not view a consumer's Metro2® formatted file.

As shown in FIG. 3, the Metro 2® formatted file is a string of alphanumeric characters where the string is divided into several substrings each corresponding to a different data field. For example, the Metro 2® formatted file may include a 30 character substring from character numbers 37-66 of the string that corresponds to the consumer account number data field. This 30 character substring may indicate the consumer's account number. In another example, the Metro 2® formatted file may include a five character substring from character numbers 130-134 of the string that corresponds to the current balance data field. This five character substring may indicate the consumer's current balance.

In any event, the consumer reporting server device 110 may generate a non-SPI consumer identifier that references the Metro 2® formatted file or a portion thereof. Then the non-SPI consumer identifier may be stored in the non-SPI credit information database 128 along with non-SPI portions of the Metro 2® formatted file. The non-SPI portions of the Metro 2® formatted file may include any data fields that cannot be used to identify, contact, or locate the consumer or identify the consumer in context. The non-SPI portions of the Metro 2® formatted file may include a portfolio type, an account type, a date opened, a credit limit, a highest credit or loan amount, a term duration, a term frequency, a scheduled monthly payment amount, an actual payment amount, an account status, a payment rating, a payment history profile indicating the consumer's payment history for the previous 24 months, a current balance, an amount past due, a billing date, a date closed, a date of last payment, an ECOA code, etc. Then when a member of the organization searches for a consumer's credit information via the non-SPI consumer identifier, the consumer reporting server device 110 may retrieve the corresponding non-SPI portions of the Metro 2® formatted file for display on a member device 152. The SPI portions of the Metro 2® formatted file may not be included on the display or may be masked, redacted, or obscured in any other suitable manner on the display.

Figure 4:
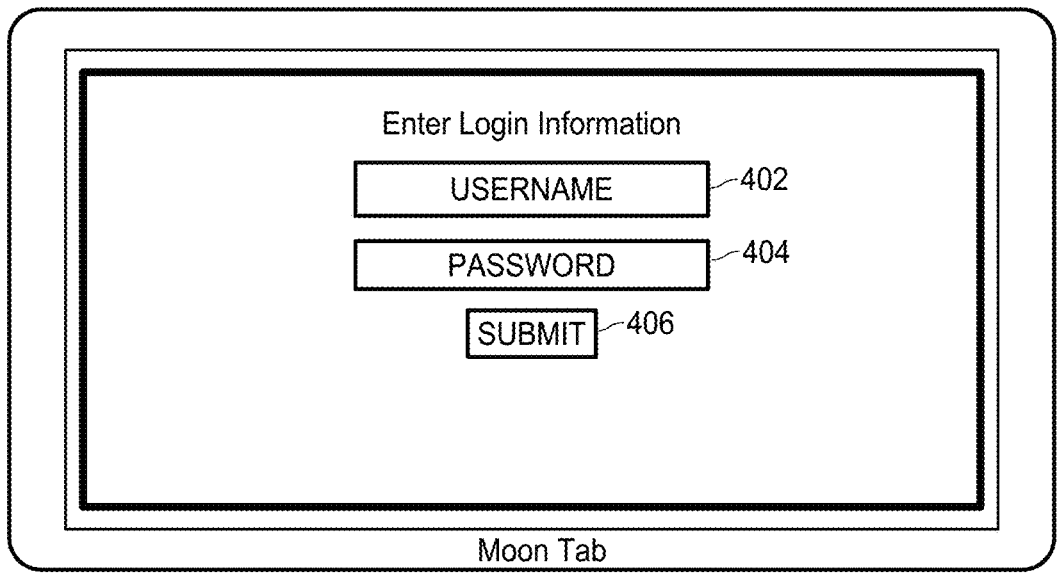
FIG. 4 illustrates an exemplary consumer reporting login display in accordance with an exemplary aspect of the present disclosure.

FIG. 4 depicts an example consumer reporting login display 400 which may be presented by the client application 266 of one of the member devices 152-158. As will be appreciated by those of ordinary skill in the relevant art(s), the exemplary display shown in FIG. 4 is for illustrative purposes, and the associated functionality may be implemented using any suitable format and/or design for facilitating corresponding described functionalities without departing from the spirit and scope of the present disclosure.

The consumer reporting login display 400 may include user controls 402, 404 for entering member login information, such as a free-form text field, drop-down menu, etc. The member login information entered on the consumer reporting login display 400 may be a phone number, username, and/or password. In some embodiments, the member login information may be pre-filled for the member on the member device 152.

Once the member login information is entered, the member may select a "Submit" button 406 to login to her member profile. The consumer reporting server device 110 may compare the received member login information entered via the user controls 402, 404 to the sets of member login information stored in a member login database (not shown). If there is a match, the member may access her member profile. The member profile may be associated with one or several security groups where each security group has permission to access certain data files. Some of the security groups such as security groups associated with members within a consumer reporting team may have access to secure data files, such as Metro 2® formatted files. However, this may include a very small subset of the members in the organization. Other security groups associated with members within several divisions or product lines of the organizations may have access to non-SPI consumer credit information stored in the non-SPI consumer credit information database 128.

In some embodiments, a member has access to the non-SPI consumer credit information for consumers associated with the same division or product line as the member. For example, when the consumer receives a vehicle loan, a security group associated with members in the vehicle loan division may have access to the non-SPI consumer credit information for the consumer. In other embodiments, members in each of the divisions and product lines may have access to the non-SPI consumer credit information for each of the consumers regardless of the division(s) or product line(s) that correspond to the consumer.

Figure 5:
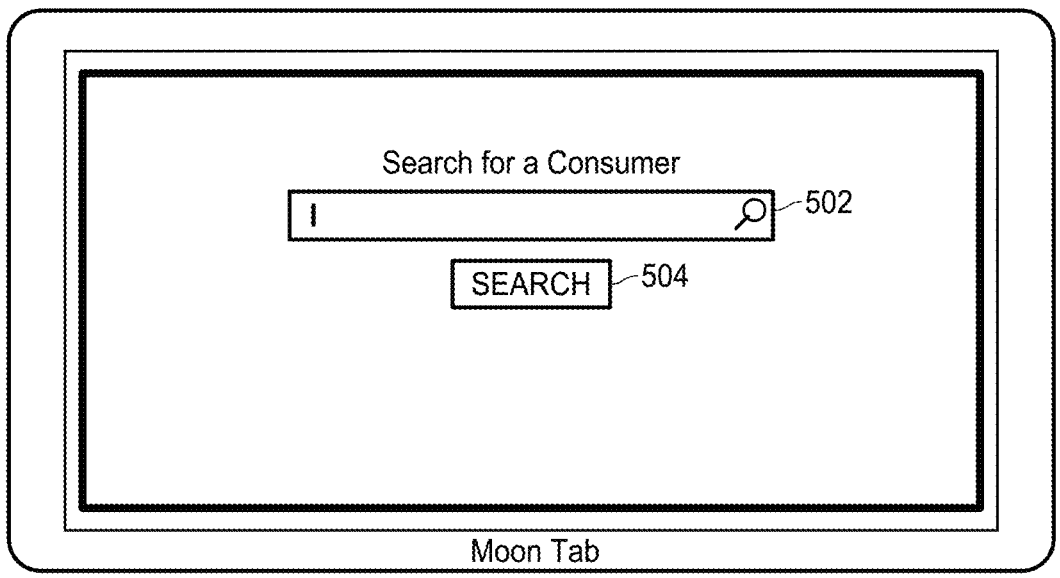
FIG. 5 illustrates an exemplary consumer search display in accordance with an exemplary aspect of the present disclosure.

In any event, a member via her member device 152 may search for a particular consumer's non-SPI consumer credit information using a consumer search display as shown in FIG. 5. FIG. 5 depicts an example consumer search display 500 which may be presented by the client application 266 of one of the member devices 152-158. As will be appreciated by those of ordinary skill in the relevant art(s), the exemplary display shown in FIG. 5 is for illustrative purposes, and the associated functionality may be implemented using any suitable format and/or design for facilitating corresponding described functionalities without departing from the spirit and scope of the present disclosure.

Figure 8:
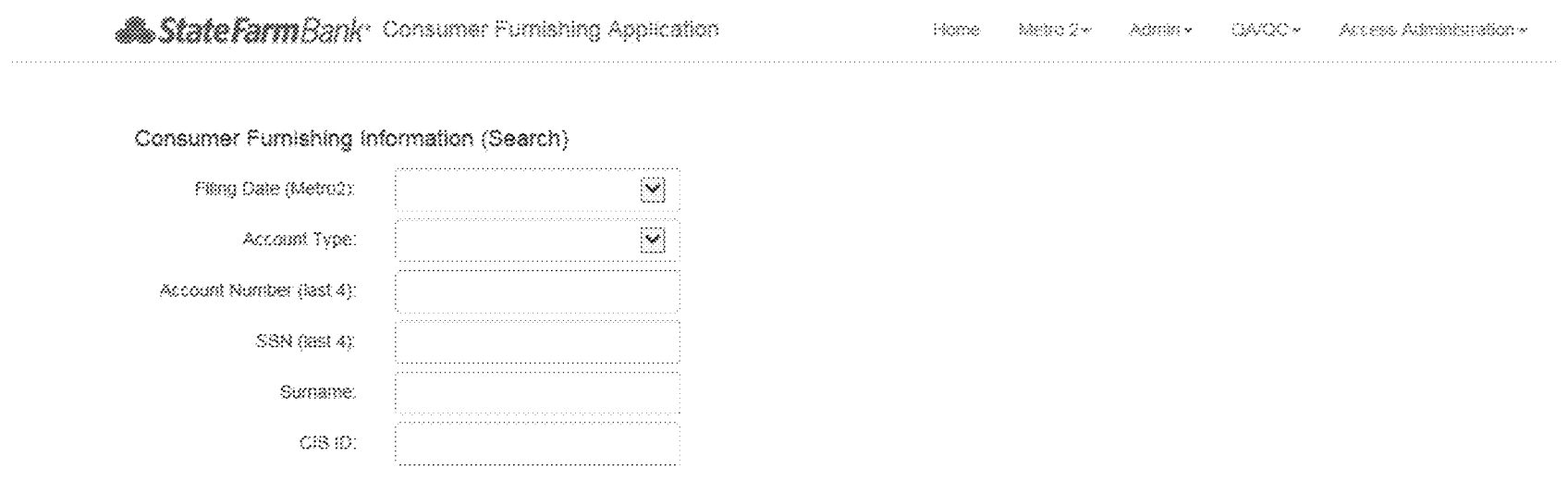

The consumer search display 500 may include a user control 502 for entering a consumer identifier, such as a free-form text field, drop-down menu, etc. The consumer identifier may be the non-SPI consumer identifier for the consumer or may be another identifier for the consumer, such as the consumer's first and last name, last four digits of the consumer's social security number, etc. Once the consumer identifier is entered, the member may select a "Search" button 504 to retrieve the non-SPI consumer credit information referenced by the non-SPI consumer identifier. When the member enters a non-SPI consumer identifier via the user control 502, the consumer reporting server device 110 may search the non-SPI consumer credit information database 128 for a set of non-SPI consumer credit information associated with the non-SPI consumer identifier. When the member enters another identifier for the consumer, the consumer reporting server device 110 may identify the non-SPI consumer identifier associated with the other identifier. Then the consumer reporting server device 110 may search the non-SPI consumer credit information database 128 for a set of non-SPI consumer credit information associated with the non-SPI consumer identifier. FIG. 8 depicts another consumer search display that may be in addition to or an alternative to the consumer search display 500 of FIG. 5. The consumer search display of FIG. 8 enables a user to search for consumers via one or more of the following fields: filing date, account type, account number, SSN, surname, and CIS ID.

If there is a match, the consumer reporting server device 110 may provide the retrieved non-SPI consumer credit information for the member device 152 to present on the non-SPI consumer credit information display as shown in FIG. 6. FIG. 6 depicts an example non-SPI consumer credit information display 600 which may be presented by the client application 266 of one of the member devices 152-158. As will be appreciated by those of ordinary skill in the relevant art(s), the exemplary display shown in FIG. 6 is for illustrative purposes, and the associated functionality may be implemented using any suitable format and/or design for facilitating corresponding described functionalities without departing from the spirit and scope of the present disclosure.

The non-SPI consumer credit information display 600 includes the data fields from the Metro 2® formatted file that do not include sensitive private information. As shown in FIG. 6, data fields that do include sensitive private information, such as a consumer account number 604, telephone number 612, date of birth 620, and social security number 628 are masked, redacted, or obscured. In other embodiments, the data fields having sensitive private information may not be included at all on the non-SPI consumer credit information display 600. In any event, values for the data fields that do not include sensitive private information (non-SPI data fields) are presented on the non-SPI consumer credit information display 600. This includes the statement date 602 indicating the current month's billing date ("7/29/2016"). This also includes an account type 606 ("00"), where account type "00" indicates an auto account, account type "04" indicates a home improvement account, account type "10" indicates a business loan, account type "18" indicates a credit card account, etc. The non-SPI data fields further include an account status 608 ("11"), where the account status may be "11" indicating the account is current and has non-zero balance amount, "71" indicating the account is 30 days past due, "78" indicating the account is 60 days past due, "80" indicating the account is 90 days past due, "82" indicating the account is 120 days past due, "83" indicating the account is 150 days past due, "84" indicating the account is 180 days or more past due, etc.

Moreover, the non-SPI data fields include a current balance of the account 610 ("$11,650.00"), a date the account was opened 614 ("25JAN2013"), a date the account was closed 622 (none), a date of first delinquency 630 (none), a date the last payment was made 638 ("11JUN2016"), a credit limit 640 ("$0.00"), a scheduled monthly payment amount 618 ("$475.00"), an actual payment amount 626 ("$0.00"), an amount past due 634 ("$0.00"), an original charge-off amount 642 ("$0.00"), and a highest credit or original loan amount 652 ("$25,939.00"). The non-SPI data fields further include the non-SPI consumer identifier 636 ("00003942267") and a portfolio type 648 ("I"), where the portfolio types may be "C" for line of credit, "I" for installment, "M" for mortgage, "O" for open account, or "R" for revolving. An ECOA code data field 616 ("2") may also be included, where the ECOA codes may be "1" for an individual contractual liability, "2" for joint contractual liability, "7" for a maker which has a co-maker that is subject to liability if the maker defaults, "T" for a terminated account, "W" for a business/commercial account, "X" for when the consumer is deceased, etc. Additionally, the non-SPI data fields include a payment history profile (PHP) 644 ("BBBBBBBBBBBBBBBBBBBBBBBB") indicating the consumer's payment history for the previous 24 months. Each character in the payment history profile data field 644 indicates the payment activity for one of the 24 months. The payment history for one month may be "0" indicating 0 payments are past due, "1" indicating a payment is 30-59 days past due, "2" indicating a payment is 60-89 days past due, "3" indicating a payment is 90-119 days past due, "4" indicating a payment is 120-149 days past due, "5" indicating a payment is 150-179 days past due, "6" indicating a payment is 180 or more days past due, "B" indicating there is no payment history available prior to this time, "D" indicating there is no payment history available for that month, "E" indicating zero balance on the current account, "G" indicating collection, "H" indicating foreclosure, "J" indicating voluntary surrender, "K" indicating repossession, or "L" indicating charge-off. Therefore the PHP data field 644 indicates there is no payment history available for the consumer for the 24 month period.

Another non-SPI data field may be a payment rating 646 ("0") that indicates whether the account is current, past due, in collections, or charged off. The payment rating may be "0" indicating a current account, "1" indicating payment is 30-59 days past due, "2" indicating payment is 60-89 days past due, "3" indicating payment is 90-119 days past due, "4" indicating payment is 120-149 days past due, "5" indicating payment is 150-179 days past due, "6" indicating payment is 180 or more days past due, "G" indicating collection, or "L" indicating charge-off. Other non-SPI data fields may include a consumer information indicator (CII) 624 (none) indicating that bankruptcy was filed, discharged, dismissed, or withdrawn, a compliance condition code (CCC) 632 (none) indicating disputes or closed accounts, or special comments 650 (none).

In any event, based on the non-SPI consumer credit information on the non-SPI consumer credit information display 600, the consumer has an auto loan account presumably for financing a vehicle, where the original loan amount was $25,939.00. The auto loan account is a joint account to be paid in installments of $475.00. The consumer is up to date on her payments with her last payment on Jun. 11, 2016 and has a current balance of $11,650.00. Based on the non-SPI consumer credit information display 600, it appears the joint account is shared with a consumer having the non-SPI consumer identifier 654 of "00003942268."

A member may view the non-SPI consumer credit information display 600 on her member device 152 when the consumer identifies an error on her credit report. Then the member may review the data fields 602-654 to verify the error identified by the consumer. For example, the consumer may believe the original loan amount is incorrect in her credit report. The member may then verify that the original loan amount in the non-SPI consumer credit information display 600 is the incorrect original loan amount identified by the consumer. If the incorrect value identified by the consumer is the same value in the non-SPI consumer credit information display 600, the member device 152 may request the consumer reporting server device 110 to provide user profile information from the consumer's user profile. The consumer reporting server device 110 may then retrieve the consumer's user profile from the user profile database 126 and provide the user profile information for display on the member device 152. The user profile information may also include financial history for the consumer and the member may view a subset of the user profile information corresponding to the same data field as the incorrect value, the original loan amount data field. In some embodiments, the member may view several subsets of the user profile information to derive the original loan amount from previous financial statements, documents signed by the consumer, etc.

In any event, the member may compare the original loan amount 652 from the non-SPI consumer credit information display 600 to the original loan amount identified or derived from the consumer's user profile information. If there is a discrepancy between the two values, the member device 152 may detect an error in the original loan amount 652 from the non-SPI consumer credit information display 600 and replace the original loan amount 652 from the non-SPI consumer credit information display 600 with the original loan amount from the consumer's user profile information. An indication of the error, the data field corresponding to the error, the value for the error, and/or any other suitable information related to the error may be provided to the consumer reporting server device 110. Them the adjusted original loan amount data field may be updated in the consumer's Metro 2® formatted file and the modified Metro 2® formatted file may be provided from the consumer reporting server device 110 to the CRA devices 106-109.

In other embodiments, the consumer reporting server device 110 and more specifically, the error correction module 118 may parse the secure data file to identify data fields and automatically compare values in the data fields of the consumer's non-SPI consumer credit information and the consumer's user profile information for example, before providing a Metro 2® formatted file to the CRA devices 106-109. When there is a mismatch, the consumer reporting server device 110 may provide a notification to a member device 152 including the data field and the different values from the non-SPI consumer credit information and the user profile information. In some embodiments, the member may perform a further review to determine which value is correct and should be provided in the Metro 2® formatted file to the CRA devices 106-109. In other embodiments, the consumer reporting server device 110 and more specifically, the error correction module 118 may automatically replace the value in the data field of the consumer's non-SPI consumer credit information with the value corresponding to the same data field from the consumer's user profile information. In this manner, an error may be detected and corrected proactively before the consumer identifies the error and notifies the organization.

When an error is detected and/or corrected in a consumer's non-SPI consumer credit information, information related to the error may be provided to the consumer reporting server device 110 and more specifically the error analysis module 120, such as the data field corresponding to the error, the incorrect value, the corrected value, the statement date of the error, the other non-SPI consumer credit information included in the statement having the error, and any other suitable information related to the error. The error analysis module 120 may also obtain non-SPI consumer credit information from statements that do not contain errors. In some embodiments, the error analysis module 120 may use the non-SPI consumer credit information from statements including errors and the non-SPI consumer credit information from statements that do not include errors as training data to generate a model for predicting the occurrence of an error. For example, the error analysis module 120 may determine that 95% of statements had an incorrect value when the account status was "80." The error analysis module 120 may perform machine learning techniques, such as naïve Bayes, decision trees, random decisions forests, etc. to generate the model for predicting the occurrence of an error in a statement or in a particular data field. For example, the model may indicate that when the ECOA data field and the amount past due data fields have particular values or are within a particular range of values and the actual payment value is less than a threshold amount there is a 90% likelihood of an error in the actual payment value.

In other embodiments, when an error is identified in the same data field for more than a threshold number and/or proportion of consumers within a particular time period, the error analysis module 120 may detect a trend for that data field. The error analysis module 120 may also determine whether the incorrect values identified in the same data field for more than a threshold number and/or proportion of consumers within a particular time period are the same or are within the same range of values.

When a Metro 2® formatted file is being generated for a consumer, the consumer reporting server device 110 may determine whether the data field includes the same value or a value within the same range of values identified as incorrect for more than a threshold number and/or proportion of consumers or identified as incorrect based on the model for predicting the occurrence of an error. If the consumer credit information is identified as incorrect or having a risk of being incorrect over a threshold risk value (e.g., 75%), the consumer credit information may be flagged and provided to a member device 152 for further review.

Additionally, in some embodiments, the error analysis module 120 may automatically correct an error by analyzing previous corrections to errors in the same data field as the error, for example. More specifically, when an error is identified in the same data field for more than a threshold number or proportion of consumers and the value for the data field is changed to the same value more than a threshold number or proportion of times, the error analysis module 120 may determine there is a consistent correction method being applied. Then the error analysis module 120 may automatically modify data fields for upcoming sets of consumer credit information to the changed value identified from the previous errors. After the data field has been modified for a particular consumer, the modified Metro 2® formatted file may be provided to the CRA devices 106-109.

In another example, when an error is identified in the same data field for more than a threshold number or proportion of consumers and the value for the data field is changed using the same algorithm more than a threshold number or proportion of times (e.g., by multiplying the value by a factor of two, by appending the letter 'E' to the end of the string, by subtracting the value by one, etc.), the error analysis module 120 may determine there is a consistent correction method being applied. Then the error analysis module 120 may automatically modify data fields for upcoming sets of consumer credit information using the algorithm identified from the previous errors. After the data field has been modified for a particular consumer, the modified Metro 2® formatted file may be provided to the CRA devices 106-109.

In yet another example, the error analysis module 120 may use the original values and changed values for a particular data field and the values in other data fields as training data to generate a model for predicting the method for correcting an incorrect value. The error analysis module 120 may perform machine learning techniques, such as naïve Bayes, decision trees, random decisions forests, etc. to generate the model. Then the error analysis module 120 may apply a value to the model for a data field identified as having an error and the model may produce predicted correction methods (e.g., replace the incorrect value with "11," multiply the incorrect value by a factor of 10, append the letter "W" to the end of the incorrect value, etc.) with corresponding probabilities that the correction method is the appropriate correction method to correct the error. In some embodiments, the error analysis module 120 may apply the correction method having the highest probability or the correction method having the highest probability when the highest probability is above a threshold. When the highest probability is not above a threshold, the consumer credit information may be provided to a member device 152 for further review.

Figure 7:
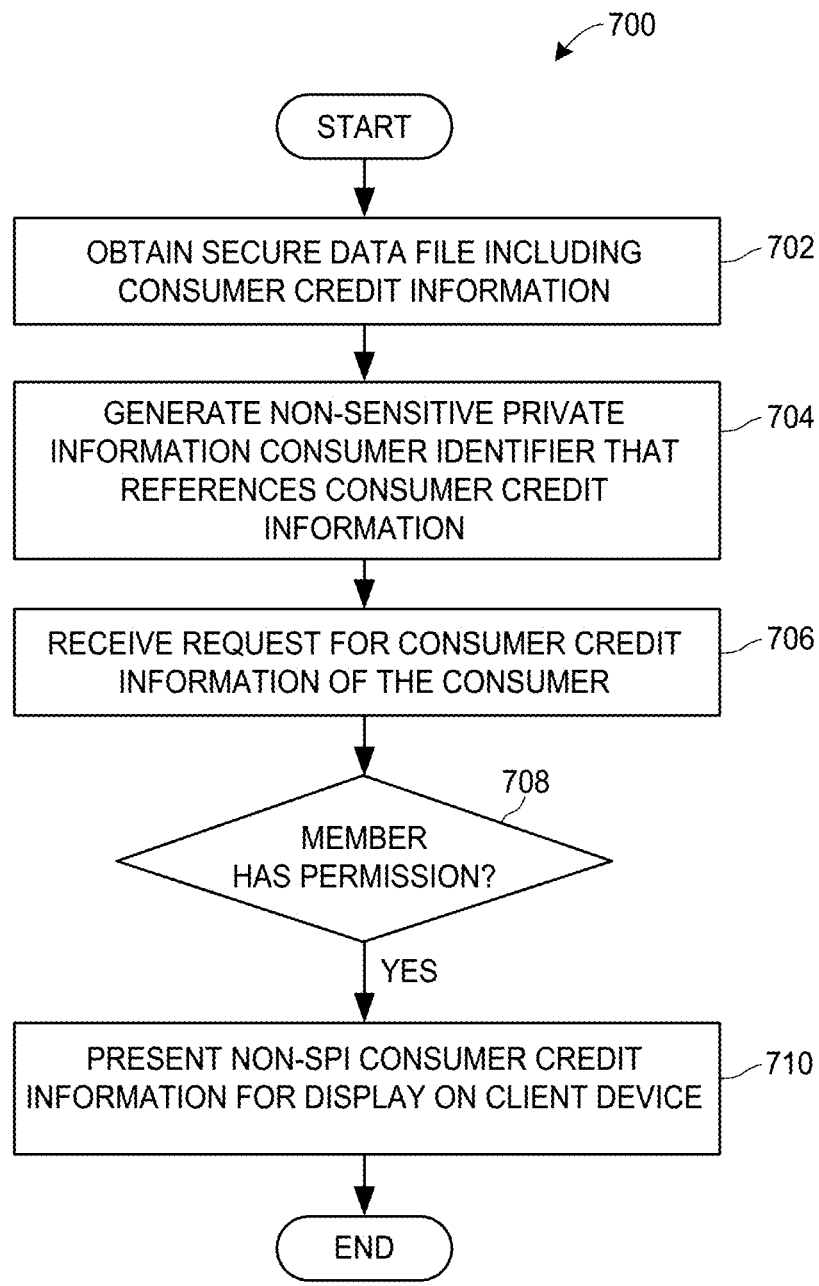
FIG. 7 illustrates a flow diagram representing an exemplary method for detecting and correcting errors in consumer reporting in accordance with the presently described embodiments.

FIG. 7 depicts a flow diagram representing an exemplary method 700 for detecting and correcting errors in consumer reporting. The method 700 may be executed on the consumer reporting server device 110. In some embodiments, the method 700 may be implemented in a set of instructions stored on a non-transitory computer-readable memory and executable one or more processors of the consumer reporting server device 110. For example, the method 700 may be performed by the non-SPI generation module 116, the error correction module 118, and/or the error analysis module 120. In other embodiments, the method 700 may be performed by the member device 152 and/or a combination of the consumer reporting server device 110 and the member device 152.

In any event, at block 702, a secure data file may be obtained having consumer credit information for a consumer, such as a Metro 2® formatted file having a string of alphanumeric characters where the string is divided into several substrings each corresponding to a different data field. The Metro 2® formatted file may include SPI consumer credit information and non-SPI consumer credit information.

Then at block 704, the consumer reporting server device 110 may generate a non-SPI consumer identifier that references the Metro 2® formatted file or an additional data set that includes the non-SPI consumer credit information within the Metro 2® formatted file. The additional data set may be stored in a non-SPI credit information database 128 along with the non-SPI consumer identifier. The non-SPI consumer identifier may be a string of alphanumeric characters and may be generated based on the last four digits of the consumer's social security number, may be randomly generated, or may be generated in any other suitable manner.

At block 706, a request for consumer credit information for a particular consumer may be received from a member device 152 of a member of an organization that provides financing to the consumer. For example, the request may be provided by entering the non-SPI consumer identifier in a search field of a client application 266 or by entering another identifier for the consumer from which the consumer reporting server device 110 may retrieve the non-SPI consumer identifier.

In any event, at block 708, the consumer reporting server device 110 may determine whether the member has permission to access the consumer's non-SPI consumer credit information. For example, the member may belong to one or more security groups associated with members within several divisions or product lines of the organization. Each security group may have access to non-SPI consumer credit information for a set of consumers. In some embodiments, a member has access to the non-SPI consumer credit information for consumers associated with the same division or product line as the member. For example, when the consumer receives a vehicle loan a security group associated with members in the vehicle loan division may have access to the non-SPI consumer credit information for the consumer. In other embodiments, members in each of the divisions and product lines may have access to the non-SPI consumer credit information for each of the consumers regardless of the division(s) or product line(s) that correspond to the consumer.

If the member does not have access to the consumer's non-SPI consumer credit information, an error message may be provided to the member device 152 and the member may be prompted to request non-SPI consumer credit information for a different consumer. On the other hand, if the consumer reporting server device 110 verifies that the member does have permission based on the member's security groups, the consumer reporting server device 110 retrieves the consumer's non-SPI consumer credit information from the non-SPI credit information database 128 using the non-SPI consumer identifier as a reference or key. Then the consumer reporting server device 110 provides the consumer's non-SPI consumer credit information to the member device 152 for display, such as on the non-SPI consumer credit information display 600 as shown in FIG. 6 (block 710). The member may then review the non-SPI consumer credit information to confirm errors identified by the consumer. Then the member may correct the errors in the non-SPI consumer credit information via the client application 266 on the member device 266 and the consumer reporting server device 110 may apply the corrected non-SPI consumer credit information to the Metro 2® formatted file. Then the modified Metro 2® formatted file may be provided to the CRA devices 106-109 for generating credit reports.

In some embodiments, the consumer reporting server device 110 may automatically identify errors in the consumer's non-SPI consumer credit information and provide indications of the errors to the member device 152. Errors may be automatically identified in the manner described above, such as by parsing the secure data file to identify a particular data field and comparing a value in the particular data field to a subset of user profile information from the consumer's user profile that corresponds to the particular data field. Errors may also be identified by generating a model for predicting the occurrence of an error and applying the consumer's non-SPI consumer credit information to the model. Moreover, errors may be identified by detecting an error trend for a particular data field when an error is identified in the same data field for more than a threshold number and/or proportion of consumers within a particular time period.

In any event, a data field identified as having an error may be highlighted on the non-SPI consumer credit information display 600, for example. In another example, the consumer reporting server device 110 may only provide the non-SPI consumer credit information related to the data fields identified as having errors for presentation on the non-SPI consumer credit information display 600. Then the member may correct an error by contacting the consumer or retrieving user profile information for the consumer and comparing a subset of the user profile information corresponding to the same data field as the error to the value in the data field.

Also in some embodiments, the consumer reporting server device 110 may automatically correct errors in the consumer's non-SPI consumer credit information. Errors may be automatically corrected in the manner described above, such as by analyzing previous corrections to errors in the same data field as the error. When an error is identified in the same data field for more than a threshold number or proportion of consumers and the value for the data field is changed to the same value more than a threshold number or proportion of times, the error analysis module 120 may determine there is a consistent correction method being applied and may apply the correction method to the data field for the consumer. In another example, when an error is identified in the same data field for more than a threshold number or proportion of consumers and the value for the data field is changed using the same algorithm more than a threshold number or proportion of times (e.g., by multiplying the value by a factor of two, by appending the letter 'E' to the end of the string, by subtracting the value by one, etc.), the error analysis module 120 may determine there is a consistent correction method being applied and may apply the correction method to the data field for the consumer. In yet another example, the error analysis module 120 may use the original values and changed values for a particular data field and the values in other data fields as training data to generate a model for predicting the method for correcting an incorrect value. Then the error analysis module 120 may apply the consumer's non-SPI consumer credit information to the model to determine the corrected value.

In some scenarios, the consumer reporting server device 110 may automatically correct an error, apply the corrected value to the Metro 2® formatted file, and provide the modified Metro 2® formatted file to the CRA devices 106-109. In other scenarios, the consumer reporting server device 110 may provide an indication of the error and corrected value to the member device 152. For example, a data field identified as having an error may include the original value and the corrected value on the non-SPI consumer credit information display 600. The member may then review the corrected value to ensure the correction is accurate and may then request the consumer reporting server device 110 to apply the correction and provide the modified Metro 2® formatted file may be provided to the CRA devices 106-109.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A computer-implemented method for correcting errors in consumer credit reporting, the method executed by one or more processors programmed to perform the method, the method comprising:

training, by the one or more processors, a first machine learning model for identifying incorrect value errors in consumer credit reporting;

training, by the one or more processors, a second machine learning model for correcting incorrect value errors in consumer credit reporting using original values and changed values for previously corrected errors;

obtaining, at the one or more processors, a secure data file including a set of consumer credit information for a consumer related to one or more products;

receiving, at the one or more processors from a user, a request for the set of consumer credit information of the consumer;

applying, by the one or more processors, the set of consumer credit information for each particular data field to the first machine learning model to identify an incorrect value error in the set of consumer credit information; and applying, by the one or more processors, the incorrect value error to the second machine learning model to automatically correct the incorrect value error.

2. The method of claim 1, further comprising:
retrieving, by the one or more processors, user profile information from a user profile of the consumer;
comparing, by the one or more processors, the user profile information to the set of consumer credit information; and
identifying, by the one or more processors, an error in the set of consumer credit information based on the comparison.

3. The method of claim 2, further comprising:
correcting, by the one or more processors, the error in the set of consumer credit information by applying the user profile information.

4. The method of claim 3, further comprising:
providing, by the one or more processors, the corrected set of consumer credit information for the consumer to a credit reporting agency.

5. The method of claim 1, wherein the set of consumer credit information is a first set of consumer credit information, receiving the secure data file including the first set of consumer credit information for the consumer includes receiving a plurality of secure data files for a plurality of consumers and further comprising:
analyzing, by the one or more processors, a plurality of errors in respective second sets of consumer credit information of the plurality of consumers to identify a trend in the plurality of errors corresponding to the respective second sets of consumer credit information.

6. The method of claim 5, further comprising:
receiving, at the one or more processors, another secure data file including a third set of consumer credit information for another consumer; and
in response to identifying the trend, applying, by the one or more processors, a corrective measure to the third set of consumer credit information for the other consumer to compensate for the trend in the plurality of errors.

7. The method of claim 1, further comprising:
verifying that the user has permission to access the set of consumer credit information.

8. A system for correcting errors in consumer reporting, the system comprising:
one or more processors;
a communication network;
a non-transitory computer-readable memory communicatively coupled to the one or more processors and the communication network and storing thereon instructions that, when executed by the one or more processors, cause the system to:
train a first machine learning model for identifying incorrect errors in consumer credit reporting;
train a second machine learning model for correcting incorrect value errors in consumer credit reporting using original values and changed values for previously corrected errors;
obtain a secure data file including a set of consumer credit information for a consumer related to one or more products;
receive, from a user, a request for the set of consumer credit information of the consumer;

apply the set of consumer credit information for each particular data field to the first machine learning model to identify an incorrect value error in the set of consumer credit information; and
apply the incorrect value error to the second machine learning model to automatically correct the incorrect value error.

9. The system of claim 8, wherein the instructions further cause the system to:
retrieve user profile information from a user profile of the consumer;
compare the user profile information to the set of consumer credit information; and
identify an error in the set of consumer credit information based on the comparison.

10. The system of claim 9, wherein the instructions further cause the system to
correct the error in the set of consumer credit information by applying the user profile information.

11. The system of claim 10, wherein the instructions further cause the system to
provide, via the communication network, the corrected set of consumer credit information for the consumer to a credit reporting agency.

12. The system of claim 8, wherein the set of consumer credit information is a first set of consumer credit information and to receive the secure data file including the set of consumer credit information for the consumer, the instructions cause the system to receive a plurality of secure data files for a plurality of consumers and the instructions further cause the system to:
analyze a plurality of errors in respective second sets of consumer credit information of the plurality of consumers to identify a trend in the plurality of errors corresponding to the respective second sets of consumer credit information.

13. The system of claim 12, wherein the instructions further cause the system to:
receive another secure data file including a third set of consumer credit information for another consumer; and
in response to identifying the trend, apply a corrective measure to the third set of consumer credit information for the other consumer to compensate for the trend in the plurality of errors.

14. The system of claim 8, wherein the instructions further cause the system to:
verify that the user has permission to access the set of consumer credit information.

15. A non-transitory computer-readable memory storing instructions thereon that, when executed by one or more processors, cause the one or more processors to:
train a first machine learning model for identifying incorrect value errors in consumer credit reporting;
train a second machine learning model for correcting incorrect value errors in consumer credit reporting using original values and changed values for previously corrected errors;
obtain a secure data file including a set of consumer credit information for a consumer related to one or more products;
receive, from a user, a request for the set of consumer credit information of the consumer;
apply the set of consumer credit information for each particular data field to the first machine learning model to identify an incorrect value error in the set of consumer credit information; and apply the incorrect value error to the second machine learning model to automatically correct the incorrect value error.

16. The non-transitory computer-readable memory of claim 15, wherein the instructions further cause the one or more processors to:
retrieve user profile information from a user profile of the consumer;
compare the user profile information to the set of consumer credit information; and
identify an error in the set of consumer credit information based on the comparison.

17. The non-transitory computer-readable memory of claim 16, wherein the instructions further cause the one or more processors to:
correct the error in the set of consumer credit information by applying the user profile information.

18. The non-transitory computer-readable memory of claim 17, wherein the instructions further cause the one or more processors to:
provide, via the communication network, the corrected set of consumer credit information for the consumer to a credit reporting agency.

19. The non-transitory computer-readable memory of claim 15, wherein the set of consumer credit information is a first set of consumer credit information and to receive the secure data file including the set of consumer credit information for the consumer, the instructions cause the one or more processors to receive a plurality of secure data files for a plurality of consumers and the instructions further cause the one or more processors to:
analyze a plurality of errors in respective second sets of consumer credit information of the plurality of consumers to identify a trend in the plurality of errors corresponding to the respective second sets of consumer credit information.

20. The non-transitory computer-readable memory of claim 19, wherein the instructions further cause the one or more processors to:
receive another secure data file including a third set of consumer credit information for another consumer; and
in response to identifying the trend, apply a corrective measure to the third set of consumer credit information for the other consumer to compensate for the trend in the plurality of errors.

* * * * *